United States Patent [19]

Glass et al.

[11] 3,871,757

[45] Mar. 18, 1975

[54] INDEX MEANS FOR AUDIO-VISUAL DEVICE

[75] Inventors: Marvin I. Glass, Chicago; Gunars Licitis, Lombard, both of Ill.

[73] Assignee: Marvin Glass & Associates, Chicago, Ill.

[22] Filed: May 13, 1969

[21] Appl. No.: 824,158

Related U.S. Application Data

[63] Continuation of Ser. No. 555,200, June 3, 1966, Pat. No. 3,484,160.

[52] U.S. Cl. ........................ 353/7, 40/28.1, 350/134, 353/17, 353/19

[51] Int. Cl. . G02b 27/02, G09f 27/00, G03b 31/06

[58] Field of Search ............. 353/15, 16, 17, 18, 19, 353/7, 9; 350/134; 40/28.1, 63 R, 63 A

[56] References Cited

UNITED STATES PATENTS

| | | | |
|---|---|---|---|
| 2,511,334 | 6/1950 | Gruber | 350/134 |
| 3,282,590 | 11/1966 | Ashmele et al. | 274/1 A |
| 3,524,272 | 8/1970 | Elwell | 350/134 |

*Primary Examiner*—Louis R. Prince
*Assistant Examiner*—Steven L. Stephan
*Attorney, Agent, or Firm*—Coffee and Sweeney

[57] ABSTRACT

An audio-visual device wherein a disc having stereoscopic pairs of transparencies is placed in the device for viewing of the several transparencies to the accompaniment of a related sound message reproduced by a phonograph mechanism within the device. The disc includes a rotatable sound record, and the phonograph mechanism is operable to effect reproduction of the several sound messages on the record. Within the audio-visual device is mechanism for sequentially indexing the pairs of transparencies for viewing and for simultaneously indexing the stylus portion of the phonograph mechanism in readiness for playing the associated portion of the record, with both indexing functions being effected by movement of a single lever on the device.

4 Claims, 11 Drawing Figures

INDEX MEANS FOR AUDIO-VISUAL DEVICE

This application is a continuation of U.S. Pat. application Ser. No. 555,200, now U.S. Pat. No. 3,484,160, filed June 3, 1966 by the inventors named in the present application.

The present invention relates generally to an audiovisual device and is particularly directed to indexing means for use in an audio-visual stereoscopic viewer, wherein a plurality of pairs of stereoscopic transparencies are carried by a disc having a record rotatably mounted thereon.

It is the primary object of the invention to provide an audio-visual device, of the type referred to above, with mechanism for simultaneously indexing the pictures for viewing and indexing a stylus means for reproduction of a related sound message, wherein such indexing mechanism is operable by movement of a single control means on the device.

Other objects and advantages will become apparent from the following description of the selected embodiment of the invention illustrated in the drawings (four sheets), wherein.

Figure 1:
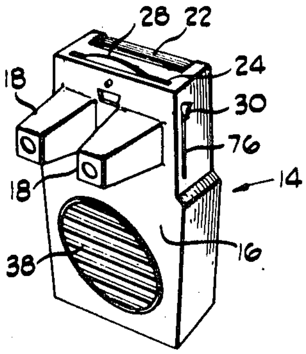
FIG. 1 is a perspective view of the audio-visual device, looking at the device from the side which is adjacent to the viewer when in use.
Figure 2:
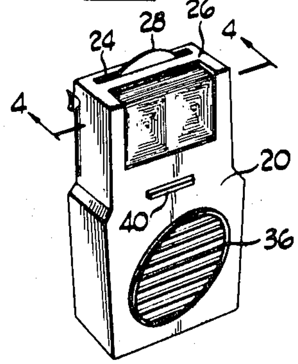
FIG. 2 is a perspective view of the opposite or front side of the device.

With reference to FIGS. 1 and 2, it will be seen that the selected embodiment of this invention comprises generally an audio-visual device 14 provided with an outer case having a rearward wall 16 supporting a pair of tapering tubes 18 which project rearwardly therefrom and are spaced to correspond with the spacing of the average human eyes. A forward wall 20 (FIG. 2) includes a light gathering lens 22 at the upper portion and extending partially across the top wall 26, and a slotted opening 24 in the top wall of the case is adapted to receive a circular card or disc 28 having stereoscopic pictures adjacent its periphery, so that a person looking through the viewing lens tubes 18 can view such pictures. The circular card 28 can be selectively rotated about its axis by means of a lever 30 at the side of the case, to thereby change the pictures being viewed by means of mechanism generally similar to that described in the aforementioned U.S. Pat. No. 2,511,334.

Figure 3:
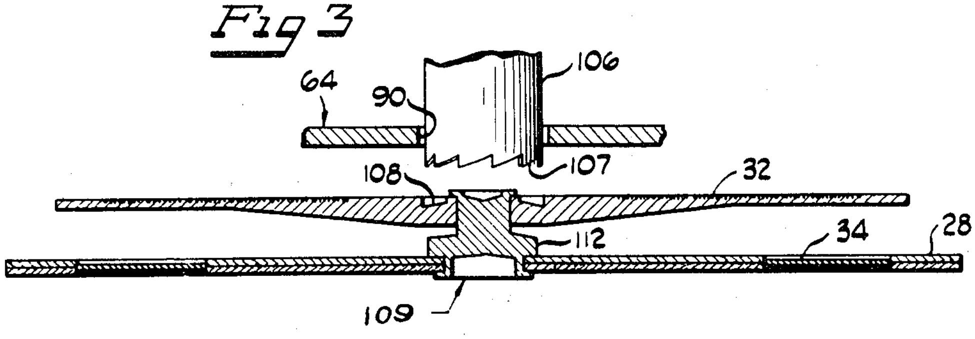
FIG. 3 is an enlarged fragmentary, cross-sectional view of the combined transparency holder and record used in the device, together with a portion of the record drive means.

In the present invention, the stereoscopic transparency holder 28 (FIG. 3) is combined with a relatively rotatable sound recording element or record 32 bearing a plurality of messages, with each message being specifically related to the subject matter of one of the pairs of transparencies in the holder. The record is preferably of translucent material and, consequently, the record can overlie the pictures 34 without seriously increasing the requirement for light through the light focusing lens 22 in order to view the pictures. The viewer case contains sound reproducing mechanism and each of the forward and rearward walls includes a grill, 36 and 38 respectively, for passage therethrough of the sound produced within the case. An operating lever or button 40 on the forward wall of the case is effective to actuate the sound reproducing mechanism.

Figure 6:
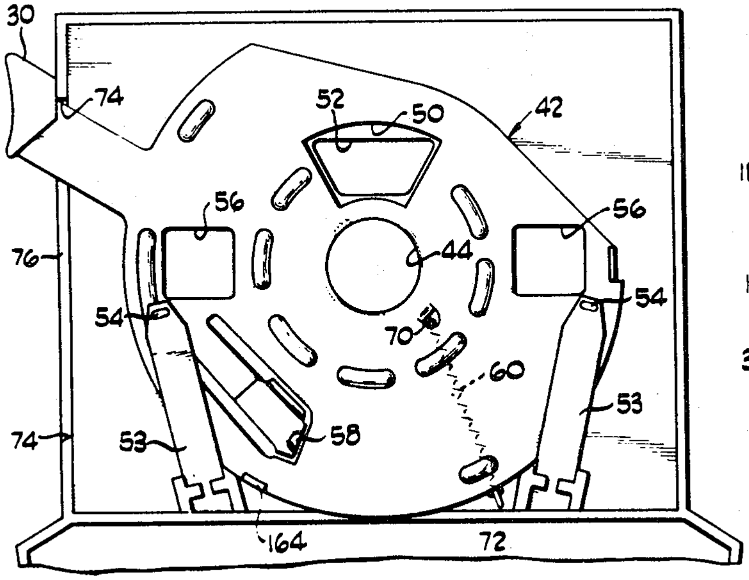
FIG. 6 is a fragmentary view taken generally along the line 6—6 in FIG. 5.

The means for supporting the transparency holder or disc 28 and for moving the disc from one set or pair of transparencies to another is quite similar to that disclosed in U.S. Pat. No. 2,511,334 and is particularly illustrated in FIG. 6 of the drawings. FIG. 6 is a fragmentary view of the inside of the rear wall 16 which includes a tubular viewing lens portions 18. The wall 16 has mounted thereon a cover plate 42 having a central opening 44 formed with an axially projecting flange portion 45 (FIG. 5), which engages and locates the cover plate 42 in a raised circular portion 48 formed on the inside of the back wall 16. The cover plate 42 (FIG. 6) is partially circular and includes the projecting lever 30 which provides means for rotating the cover plate, to thereby change the location of the transparencies relative to the viewing tubes 18 through the accompanying rotation of the disc 28. The cover plate 42 includes a radial slot 50 which is normally aligned with aperture 52 (FIG. 5) in the rear wall 16 of the housing, to provide means for viewing the title or description ordinarily printed on the transparency disc holder. The disc or reel 28 is inserted through the slotted opening 24 in the top wall of the housing in forwardly, overlying relation to the cover plate 42, and the disc is held in position thereon by means of a pair of flat reel-lock, spring members 53 which are generally flat and include tapered bent-end portions 54 to permit easy positioning of the disc between the cover plate 42 and the flat springs 53 and which also provide for indexing of the disc in a manner to be described.

The cover plate 42 also includes a pair of laterally aligned window portions 56 in position for registration with the axis of the pair of tubular viewing lens members 18. An upwardly bent, spring-like section 58 of plate 42 provides a one-way drive means which cooperates with openings 62 (FIG. 11) in the transparency holder 28 to effect easy rotation of the holder with the cover plate 42 when the lever 30 is depressed. As seen particularly in FIG. 11, there is an overlying plate or casing 64 which cooperates with the cover plate 42 in providing means for receiving the transparency holder, and this overlying plate 64 has arcuate ribs 66 adjacent its lower edge in position to assist in centering the circular transparency holder 28 on the cover plate 42. The cover plate 42 is biased into the position seen in FIG. 6 by means of a tension spring 60 having one end fixed to a punched out ear 70 on the cover plate and its other end anchored to a lug 72 formed in the underlying inner wall of the housing. The movement of the lever 30 is limited by a pair of shoulders 74 on the end of the lever slot 76 formed in the housing wall, with the uppermost shoulder insuring proper indexing of the windows 56 with the transparencies and the viewing lens portions 18. The cover plate 42 conceals the transparencies from view through the viewing tubes 18 during depression of the lever 30, since the solid portion of plate 42 is passing in front of the viewing lenses during this time. The clearance between the cover plate 42 and the overlying plate 64 is, of course, sufficient to permit free passage and rotation of the transparency disc holder and record. The spring-like ear 58 serves as a one-way clutch or drive in providing rotation of the disc 28 as the lever 30 is lowered and in permitting movement of the cover plate relative to the disc upon the return, upward movement of the lever.

Figures 4, 5:
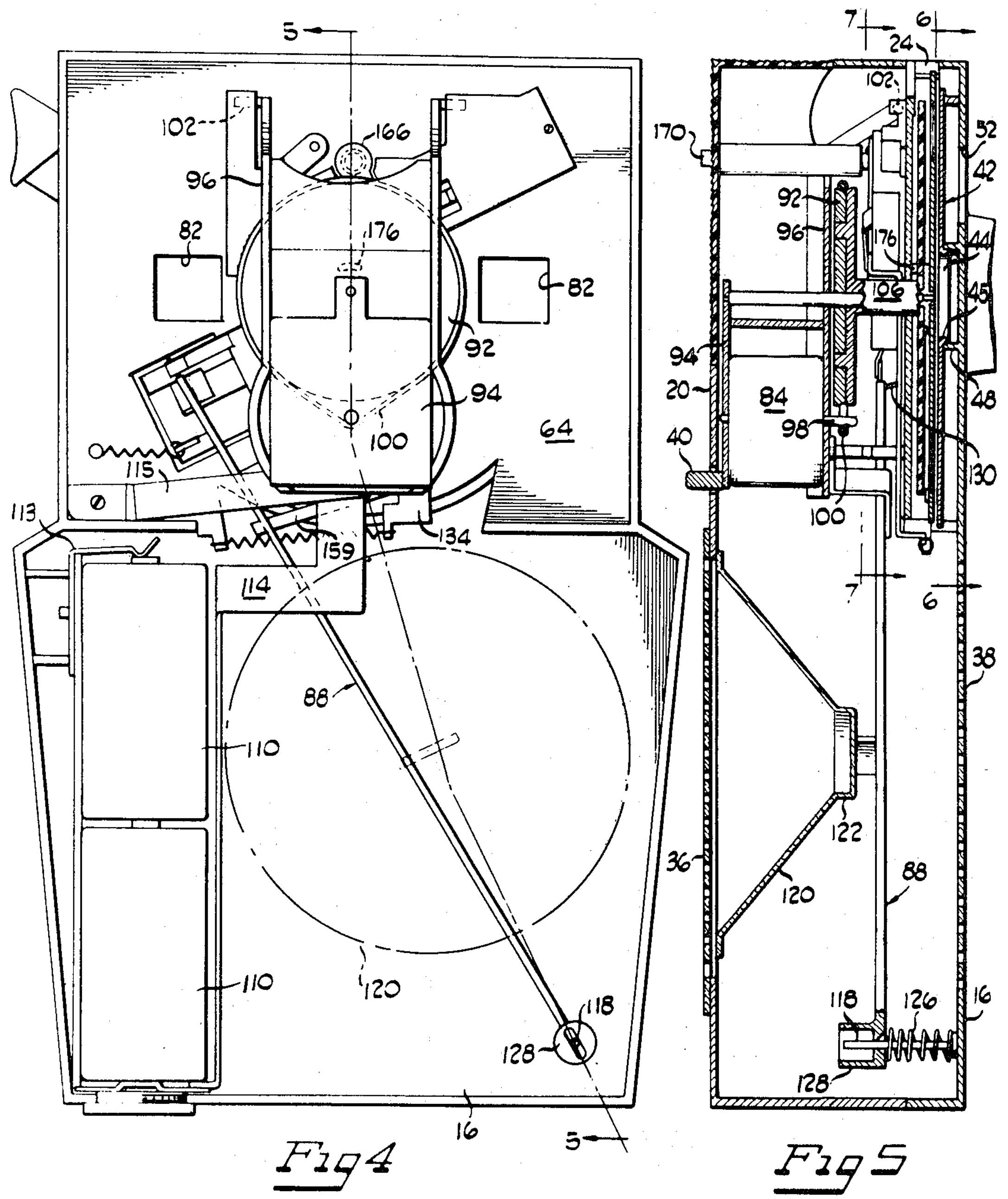
FIG. 4 is an enlarged front elevational view, taken generally along the line 4—4 in FIG. 2 and with the forward wall of the housing removed.
FIG. 5 is a sectional view taken along the line 5—5 in FIG. 4, with the addition of the forward wall and the amplifying cone attached thereto.
Figure 7:
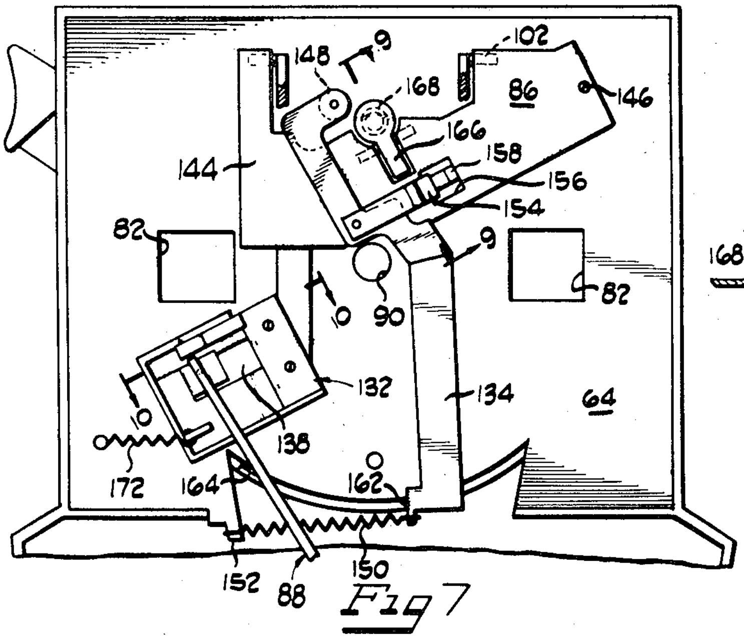
FIG. 7 is a view taken along the line 7—7 in FIg. 5, with portions broken away and omitted in order to illustrate details of particular mechanism.
Figure 10:
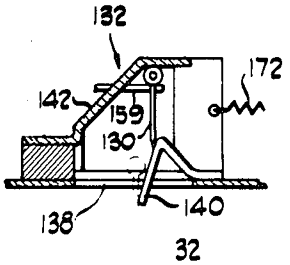
FIG. 10 is an enlarged sectional view taken along the line 10—10 in FIG. 7.
Figure 11:
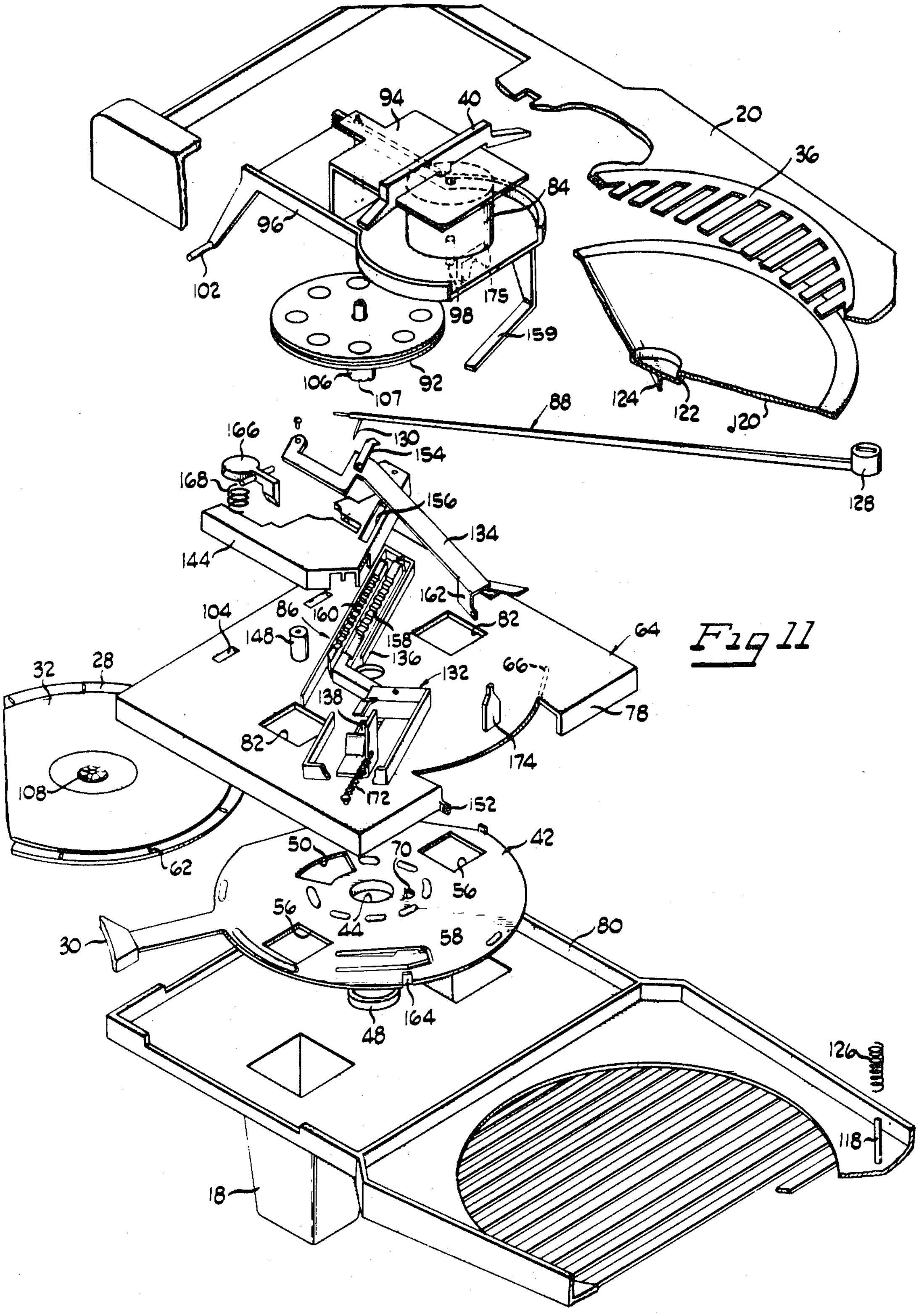
FIG. 11 is an exploded view of the mechanism seen in the preceding figures, with portions broken away and in section.

The overlying plate 64 is seen particularly in FIG. 11 and comrises a generally rectangular plate with edges 78, which fit snugly within the inwardly facing wall portions 80 of the housing (FIG. 7). This plate is also formed with a pair of window portions 82, which are aligned with the windows 56 in cover plate 42 and with the tubular viewing lens members 18. The plate 64 serves as a support for a portion of the sound producing mechanism, including the motor 84 for driving the record and ratchet means 86 for indexing a tone arm 88 relative to the record. With reference also to FIGS. 7–10, it will be seen that the plate 64 includes a central opening 90, and a rotatable drive means is positioned for movement through such opening to thereby drivingly engage the hub or center of the record. More particularly, a fly wheel 92 (FIG. 5) is rotatably supported on a bracket 94 secured to the topside of a channel-like member 96 which also supports the small electric motor 84 having its shaft 98 in driving connection with the fly wheel, as by means of a belt 100. The belt extends around the periphery of the fly wheel 92 and around the motor shaft 98, as seen in FIg. 5. The channel-like drive-supporting bracket 96 includes at one end a pair of downwardly extending leg portions, each of which is provided with a laterally projecting stub shaft portion 102. These stub shafts are aligned with and are journaled in a pair of bearings 104 formed in plate 64, to thereby permit swinging movement of the entire drive mechanism relative to the supporting plate 64. The fly wheel 92 has an axially projecting hub portion 106, which is formed at its free end with a series of radially stepped surfaces 107 which are adapted to mate with correspondingly inclined surfaces 108 (FIG. 3) in the center of the record to thereby provide a positive drive between the two. Consequently, as the drive supporting bracket 96 is pivoted toward the record, the hub 106 passes through the opening 90 in the center of the plate 64 and into a position of driving engagement with the center portion of the record. Rotation of the fly wheel 92 causes the complementary, facing surfaces 107 and 108 of the hub and record, respectively, to lock together in the manner of a one-way clutch arrangement. In this respect, it is to be noted that the record 32 is rotatably supported on and secured to the disc 28 by a rivet means 109 including an intermediate bearing flange 112.

The motor 84 is electrically driven through suitable means, such as the pair of flashlight batteries 110 illustrated in FIg. 4. The electrical contacts 113, 114 for transmitting current to the motor are arranged to cooperate with a spring metal part 115, so that current is provided for the motor only when the drive supporting bracket 96 has been moved downwardly toward the plate 64 and record 32. More particularly, the flat spring metal contact 115 is secured to the plate 64 with its free end biased away from the plate in underlying relation to the drive supporting bracket 96. Spring member 115 and contact 113 are connected with the motor 84 and as member 115 is depressed, it bears against the contact 114 to thereby close the circuit and energize the motor. The elongated button 40 (FIG. 5) which projects through the front wall 20 of the housing, serves as a means for depressing the drive supporting bracket 96 to thus close the electrical circuit and also place hub 106 in driving engagement with the record 32. Consequently, the operation of the motor 84 and the resulting rotation of the record is effected only when the button 40 is pressed toward the rear wall 16. Release of the button 40 causes spring contact 115 to move the drive bracket 96 upwardly away from the record while opening the circuit to the drive motor.

The means for reproducing the sounds incorporated on the record comprises generally the elongated tone arm 88, which is supported in the lower portion of the housing as by a pivot pin 118, and an amplifying cone 120 which is of plastic or other suitable acoustical material and is secured to the inner surface of the front wall 20 generally opposite the grill 36. The apex 122 of the sound cone 120 is flattened to provide a surface of sufficient area to provide constant engagement by an intermediate portion of the tone arm 88 as the latter sweeps the record. In the illustrated embodiment, the cone apex 122 is provided with a projecting rib 124 in a position such that the tone arm engages the rib 124 on the cone during the entire playing of the record, preferably moving toward the center part of the rib as the tone arm reaches the center cut on the record. A coil spring 126 is interposed between a pivot hub 128 on the end of the tone arm and the housing, so as to control the pressure on the record of a needle or stylus 130 at the opposite end and maintain engagement between arm 88 and rib 124 during playing of a record. Spring 126 also serves to avoid transmittal of any shock from the casing to the tone arm 88. Of course, the stylus or needle 130 transmits the vibrations caused by the grooves cut on the record 32 through the tone arm 88 to the sound reproducing or amplifying cone 120. In the acoustical type of sound reproducing mechanism disclosed herein, it is generally preferred that the records used with such mechanism be of the vertically modulated type, such as are widely used in connection with talking toy mechanisms.

The sound reproducing mechanism is designed so that a record bearing a plurality of separate messages, each correlated with a pair of transparencies on the disc 28, can be used. Further, the disclosed mechanism insures positive indexing of the tone arm 88 and needle 130, so that as the cover plate 42 is rotated to change or rotate the disc 28 to the next set of pictures the needle 130 is also moved to the next message on the record 32. The individual messages on the record are preferably separated by a continuous groove, so that the succeeding message cannot be reproduced without also rotating the cover plate 42 to expose the next pictures to view. Furthermore, the release of the drive button 40 will cause the needle 130 and tone arm 88 to move back to the beginning of the message and the subsequent depressing of the button will effect a repeat of the message. Thus, as a particular picture is being viewed, the accompanying message can be repeated as frequently as desired.

Figure 9:
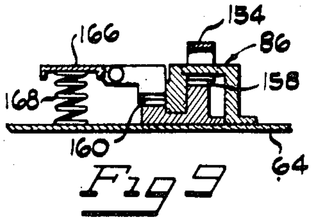
FIG. 9 is an enlarged sectional view taken along the line 9—9 in FIG. 7.

More particularly, and with reference to FIGs. 7–11, the means for indexing the tone arm 88 comprises generally a stylus guide 132, ratchet means 86, and a feed advance lever 134, which cooperate with a portion 164 on the cover plate 42 (FIG. 6) and the lever 30 to insure proper positioning of the needle 130 each time a particular pair of transparencies are viewed. The stylus guide 132 and ratchet 86 are joined as a unit and are slidably mounted within a ribbed area 136 of the intermediate plate 64. A portion of the stylus guide 132 overlies an opening 138 in the intermediate plate 64 to permit passage of the needle 130 therethrough during operation of the sound viewer. The stylus guide 132 (FIG. 10) is preferably a metal stamping formed with a lower inclined flange portion 140 and an upper inclined flange portion 142, which flange portions provide for guidance and proper limitation of the movement of the tone arm and needle. As seen in FIG. 10, the needle 130 is normally disposed between these bent flange portions 140, 142.

Figure 8:
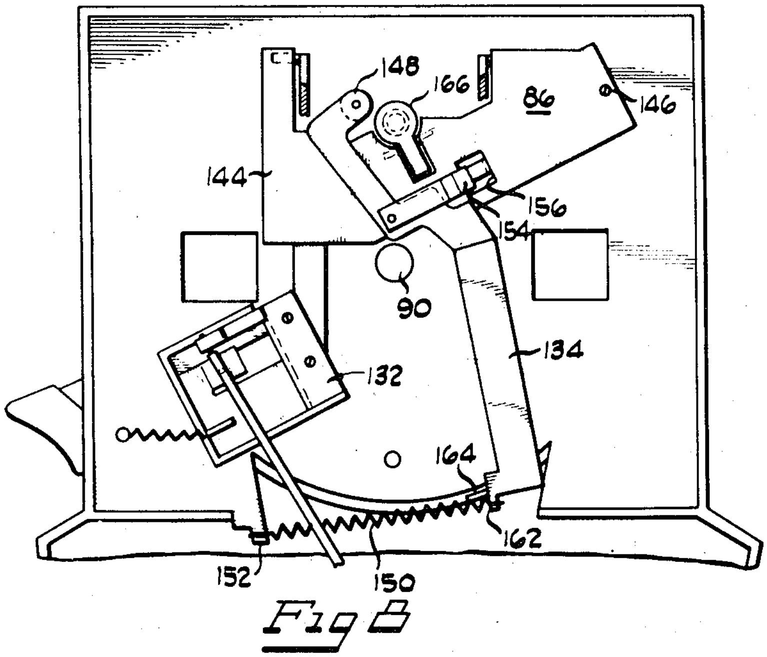
FIG. 8 is a view similar to FIG. 7 but illustrating certain portions of the mechanism in other positions.

Overlying the slidable rack or ratchet 86 is a ratchet cover 144 which is secured in position on the upper face of the intermediate plate 64, as by screws 146. The feed advance lever 134 is pivoted at one end on a supporting post 148 fixed to the intermediate plate 64, and the free end of this lever is attached to a coil spring 150, fixed at its opposite end to a lug 152 on plate 54, biasing the free end toward the left, as seen in FIGS. 7 and 8. An intermediate curved portion of the advance lever has fixed thereto a feed advance spring 154 including a downwardly bent end portion which projects through an opening 156 in the cover 144 to engage the larger toothed rack portion 158 of the feed ratchet 86. In this latter respect, it will be noted that the feed ratchet comprises a pair of parallel racks or toothed portions, 158 and 160, one such portion 160 having teeth disposed below the level of the higher toothed rack 158 (FIg. 9). The free end of the feed advance lever 134 includes a shoulder portion 162 in position for engagement by an upwardly bent ear 164 formed in the cover plate 42. Consequently, as the cover plate 42 (FIG. 6) is rotated by a downward movement of the lever 30, the ear 164 bears against the shoulder 162 on the advance lever 134 and effects counterclockwise rotation thereof. Such movement causes the feed advance spring 154 to shift the slidable rack 158 to the right and thereby carry the stylus guide 132 also to the right. The increments of movement thus achieved for the rack and the stylus guide are closely related to the spacings of the messages on the record.

The tone arm 88 is supported at its free end on the arm or bracket 159 depending from the lower side of the drive bracket 96. The drive bracket 96 is biased upwardly by the spring contact 115, and arm 159 is thereby positioned to normally hold the stylus 130 in an elevated position with respect to the record 32, as seen in FIG. 10. As the cover plate 42 is rotated to position a particular pair of transparencies for viewing, the stylus guide 132 is shifted to move tone arm 88 along support arm 159 and position the needle 130 in readiness for reproduction of the appropriate message on the record. As the operating button 40 (FIG. 5) is pressed inwardly, the drive bracket 96 and arm 159 are moved in the direction of the record 32, thus releasing tone arm 88 for movement with needle 130 toward record 32. As seen in FIG. 10, such movement of needle 130 is guided by flange 140 on the stylus guide to accurately position the needle in the appropriate groove on the record, as indicated by the dotted line showing of needle 130.

The lower rack 160 forms a portion of the means for properly indexing the feed ratchet 86 and holding it in place, it being understood that the feed advance spring 154 only engages the larger rack 158 during advancement of the stylus guide 132. More particularly, the cover 144 pivotally supports a pawl or latch 166 (FIGS. 7–9) which is biased by a coil spring 168 into a position of engagement with one of the teeth of the index rack 160. An indexing or synchronizing button 170 projecting through the lens portion of casing 14 (FIG. 5) is positioned to engage the latch 166 and tilt it out of engagement with the rack 160. A tension spring 172 interposed between the intermediate plate 64 and the stylus guide 132 is effective to move the ratchet 86 and stylus guide 132 to the left upon release of the latch 166.

In the operation of the mechanism, a combination transparency holder 28 and record 32 is inserted in the casing 14 through slot 24, and through operation of the lever 30 is rotated until view No. 1 on the disc is in position for viewing. In this respect, it is understood that as a pair of the photographs on disc 28 are indexed for viewing they are in an aligned position with the tubular viewing lenses 18, openings 56 in plate 42 and openings 82 in plate 64. Consequently, the light entering the front lens 22, preferably a Fresnel lens, passes through the translucent record 32 and illuminates the picture frames 34 for viewing through the tubes or eye-pieces 18. When disc 28 is positioned to present the first picture for viewing, the feed rack 86 may have been moved to a position such that the tone arm 88 and needle 130 overlie an intermediate or inner portion of the record. However, upon depression of the index button 170, the feed rack 86 is freed and caused to slide to its starting position to the left by action of the coil spring 172. Thus, the needle 130 is placed in position for playing the first or outermost message on the record which is associated with the No. 1 picture. As the subsequent transparencies are brought into view in sequence, through operation of lever 30 and rotation of cover plate 42, the tone arm 88 is also sequentially moved toward the inner portion of the record through the action of the feed advance 154, in the manner described previously.

The clockwise motion of the advance lever 134 is limited by a projecting stop element 174 on the intermediate plate 64. The outer end of this stop element also serves to guide and limit the downward movement of the drive supporting bracket 96 through cooperation with a yoke element 175 (FIG. 11), in order to prevent binding of the advance lever 134 and other portions of the mechanism during rotation of the record as well as to center hub 106 on the driven portion 108 of record 32. There is also preferably provided means in the form of a rib 176 (FIG. 5) on the inner face of the intermediate plate 64 for limiting any possible tilting or wobbling of the record about its axis during rotation. It is not necessarily intended that this rib 176 will constantly bear against the record, but it is sufficiently close thereto to stabilize the record in the event that there is any tendency for the record to tilt relative to its axis of rotation.

In summary, the operation of the disclosed audio-viewer is as follows. A combination transparency disc and record 28, 32 is inserted through the slot 24 in the upper wall 26 of the housing to a position such that the lower edge thereof rests against arcuate ribs 66 formed on the inner face of the intermediate plate 64. The lever 30 at the right of the housing is depressed to rotate the cover plate 42 through a path sufficient to bring the No. 1 picture to view. Such rotation is accompanied by a shifting of the feed rack 86 and stylus guide 132 to the right in the figures. However, upon depression of the synchronizing button 170, the latch 166 is disengaged from the index rack 160 and the entire feed rack and stylus guide slide back to the left under the tension of the spring 172. The extent of such movement is limited by the ribs defining the area 136 formed on the intermediate plate 64. The tone arm 88 and needle or stylus 130 are now in a position overlying the outermost groove in the record, having been thus positioned by the arm 159 and the stylus guide. The button 40 on the forward wall 20 of the housing is then depressed to pivot the entire drive bracket assembly 96 in the direction of the record 32 and thereby cause the end of the drive hub 106 to engage the complementary toothed center portion 108 (FIG. 3) of the record. At this same time, the contacts 114, 115 are brought into engagement with each other to close the electrical circuit to motor 84 and effect operation of the motor. The drive belt 100 and fly wheel or pulley 92, as well as the drive hub 106, are thereby rotated so long as the button 40 is held in its depressed position. In this respect, it is preferred that the record is cut to provide a continuous groove at the end of each message, so that when a message is completed the stylus will rid in the blank, continuous groove and there will be no further message sound even though the button might be held depressed. As the button 40 is released, and the drive bracket 96 moves upwardly, the tone arm 88 is also moved upwardly from the record by virtue of the bracket or arm 159. During the upward movement of the stylus it is guided to the left by means of the upper flange 142 on the guide (FIG. 10) so as to move the stylus outwardly to the beginning of the message on the record. Consequently, by simply releasing the operating button 40 and depressing it again, the message can be repeated as often as desired while viewing the same pair of transparencies.

Although shown and described with respect to particular structure, it will be apparent that various modifications might be made therein without departing from the principles of this invention.

What is claimed is:

1. In an audio-visual device for stereoscopic viewing of pairs of photographic transparencies and for reproducing accompanying sounds, said device including a housing, a transparency-carrying disc having a plurality of pairs of circumferentially arranged transparencies mounted therein and adapted to be inserted in said housing, a sound record rotatably mounted on said disc, and a stylus means mounted in said housing for movement relative to said record, the improvement comprising means for simultaneously indexing one of said pairs of transparencies for viewing and positioning said stylus for reproduction of a related message on said record, said indexing means comrising a rotatable plate for supporting said disc within said housing and having a lever portion projecting from the housing, so that movement of said lever effects rotation of said plate and said disc, stylus guide means within said housing comprising a part positioned for engagement with said stylus means and movable through a path parallel to a face of said rotatable plate, a toothed rack fixed to said part, and a pawl in said housing which is movable in response to the rotary movement of said plate to engage a tooth of said rack and move said rack to thereby effect movement of said stylus guide means through a predetermined increment of travel.

2. Indexing means in an audio-visual device as set forth in claim 1, wherein said stylus means comprises a tone arm having one end pivotally mounted in said housing and having a stylus at its free end, spring means biasing said free end of said tone arm in a direction generally at right angles to and away from said record, and said part of said stylus guide means overlies the stylus end of said tone arm to retain the latter in an area defined by said part while permitting limited movement of said stylus radially of said record.

3. Indexing means in an audio-visual device as set forth in claim 2, wherein said part comprises a yoke-like element including leg portions, one of which is inclined so that the free end of said tone arm and said stylus are guided radially outwardly with respect to said record as said tone arm is moved away from said record under the biasing action of said spring means.

4. Indexing means in an audio-visual device as set forth in claim 3 wherein said record has a plurality of separate messages recorded thereon, and wherein the leg portions of said yoke-like element are spaced apart a distance corresponding with the width on the record which comprise each of the separate messages thereon.

* * * * *